(12) United States Patent
Megiveron et al.

(10) Patent No.: US 7,735,858 B2
(45) Date of Patent: Jun. 15, 2010

(54) AIRBAG DEVICE

(75) Inventors: Michael Gene Megiveron, Sterling Heights, MI (US); Nicole Wiggins, Southfield, MI (US); Brandon Scott Marriott, Waterford, MI (US)

(73) Assignee: TK Holdings Inc., Auburn Hills, MI (US)

(*) Notice: Subject to any disclaimer, the term of this patent is extended or adjusted under 35 U.S.C. 154(b) by 0 days.

(21) Appl. No.: 12/076,074

(22) Filed: Mar. 13, 2008

(65) Prior Publication Data
US 2009/0230659 A1 Sep. 17, 2009

(51) Int. Cl.
*B60R 21/16* (2006.01)
(52) U.S. Cl. .................................. 280/730.2
(58) Field of Classification Search ............... 280/730.2, 280/730.1, 729; 244/122 AG; 296/178, 35.2, 296/1.04, 187.02
See application file for complete search history.

(56) References Cited

U.S. PATENT DOCUMENTS

| 3,243,822 | A | * | 4/1966 | Lipkin | 2/455 |
|---|---|---|---|---|---|
| 3,603,535 | A | * | 9/1971 | DePolo | 244/121 |
| 3,630,472 | A | * | 12/1971 | Axenborg | 244/32 |
| 5,586,782 | A | * | 12/1996 | Zimmerman et al. | 280/730.2 |
| 5,630,616 | A | * | 5/1997 | McPherson | 280/730.2 |
| 5,788,272 | A | * | 8/1998 | Yanase | 280/730.2 |
| 5,911,434 | A | * | 6/1999 | Townsend | 280/730.2 |
| 6,554,348 | B1 | * | 4/2003 | Gernstein | 296/178 |
| 7,198,288 | B2 | * | 4/2007 | Kim et al. | 280/730.2 |
| 7,407,182 | B2 | * | 8/2008 | Aoki et al. | 280/730.2 |
| 2003/0146605 | A1 | * | 8/2003 | Acker et al. | 280/730.1 |
| 2006/0267318 | A1 | * | 11/2006 | Nishikaji et al. | 280/730.2 |

OTHER PUBLICATIONS

Hinch, John et al., "Report to Congress School Bus Safety: Crashworthiness Research", Research and Development National Highway Traffic Safety Administration, Apr. 2002, 59 pages.

* cited by examiner

*Primary Examiner*—Eric Culbreth
(74) *Attorney, Agent, or Firm*—Foley & Lardner LLP

(57) ABSTRACT

The disclosed airbag device may protect a vehicle occupant in a vehicle seat of a motor vehicle. The airbag device may comprise an airbag cushion that functions as a side airbag and as a curtain airbag so as to cover an area of a portion of an interior side wall of the vehicle, a portion of a window glass, or a combination thereof upon deployment. The airbag cushion may have a width in fore and aft directions and a height which result in the portion of window glass, the portion of the interior side wall, or the combination thereof being covered in a vicinity of the vehicle occupant such that a thorax, a pelvis, a shoulder and a head of the vehicle occupant are protected from directly contacting adjacent interior side surfaces of the motor vehicle during a crash event.

18 Claims, 8 Drawing Sheets

AIRBAG DEVICE

BACKGROUND

Buses and motor coaches today use the "compartmentalization" approach to occupant safety which provides effective protection to passengers when the bus or motor coach is involved in a frontal- or rear-impact collision. "Compartmentalization" was not designed or intended to protect occupants during lateral impact events.

There are no known effective applications of seat-mounted side-curtain airbags in buses or motor coaches.

SUMMARY OF THE INVENTION

According to one embodiment of the present invention, an airbag device for protecting a vehicle occupant in a vehicle seat of a motor vehicle may comprise an airbag cushion that functions as a side airbag and as a curtain airbag so as to cover an area of a portion of an interior side wall of the vehicle, a portion of a window glass, or a combination thereof upon deployment. The airbag cushion may have a width in fore and aft directions and a height which result in the portion of window glass, the portion of the interior side wall, or the combination thereof being covered in a vicinity of the vehicle occupant such that a thorax, a pelvis, a shoulder and a head of the vehicle occupant are protected from directly contacting adjacent interior side surfaces of the motor vehicle during a crash event.

According to another embodiment of the present invention, a vehicle may comprise a vehicle seat comprising a back support and a sitting pad; and an airbag device for protecting a vehicle occupant in the vehicle seat. The airbag device may comprise an airbag cushion that functions as a side airbag and as a curtain airbag so as to cover an area of a portion of window glass, a portion of an interior side wall of the vehicle, or a combination thereof upon deployment. The airbag cushion may have a width in fore and aft directions and a height which result in the portion of window glass, the portion of the interior side wall, or the combination thereof being covered in a vicinity of the vehicle occupant such that a thorax, a pelvis, a shoulder and a head of the vehicle occupant are protected from directly contacting adjacent interior side surfaces of the vehicle during a crash event.

It is to be understood that both the foregoing general description and the following detailed description are exemplary and explanatory only, and are not restrictive of the invention as claimed.

BRIEF DESCRIPTION OF THE DRAWINGS

The features, aspects, and advantages of the present invention will become apparent from the following description, appended claims, and the accompanying exemplary embodiments shown in the drawings, which are briefly described below.

DETAILED DESCRIPTION

The designed airbag device according to various embodiments of the present invention is designed especially for use in buses and motor coaches, especially, for example, in school buses designed to comply with the Federal Motor Vehicle Safety Standard (FMVSS) 222. The disclosed airbag module provides protection over a larger coverage area than any known seat-mounted side airbag as the airbag cushion is wider and taller than that known in the art. The airbag cushion may cover window glass and side walls of a bus or motor coach to fulfill the requirements of a side airbag and a curtain airbag in one package; thus providing curtain protection with side impact protection. As a result, during a "rollover" crash event, unrestrained vehicle occupants will not be ejected from the vehicle (i.e., bus or motor coach), thus preventing potentially serious injury or death.

The disclosed seat-mounted, side-curtain airbag device is designed for use in buses (such as school buses), motor coaches, or similar vehicles. It is noted, however, that the airbag device may be used in other appropriate vehicles.

Figure 1:
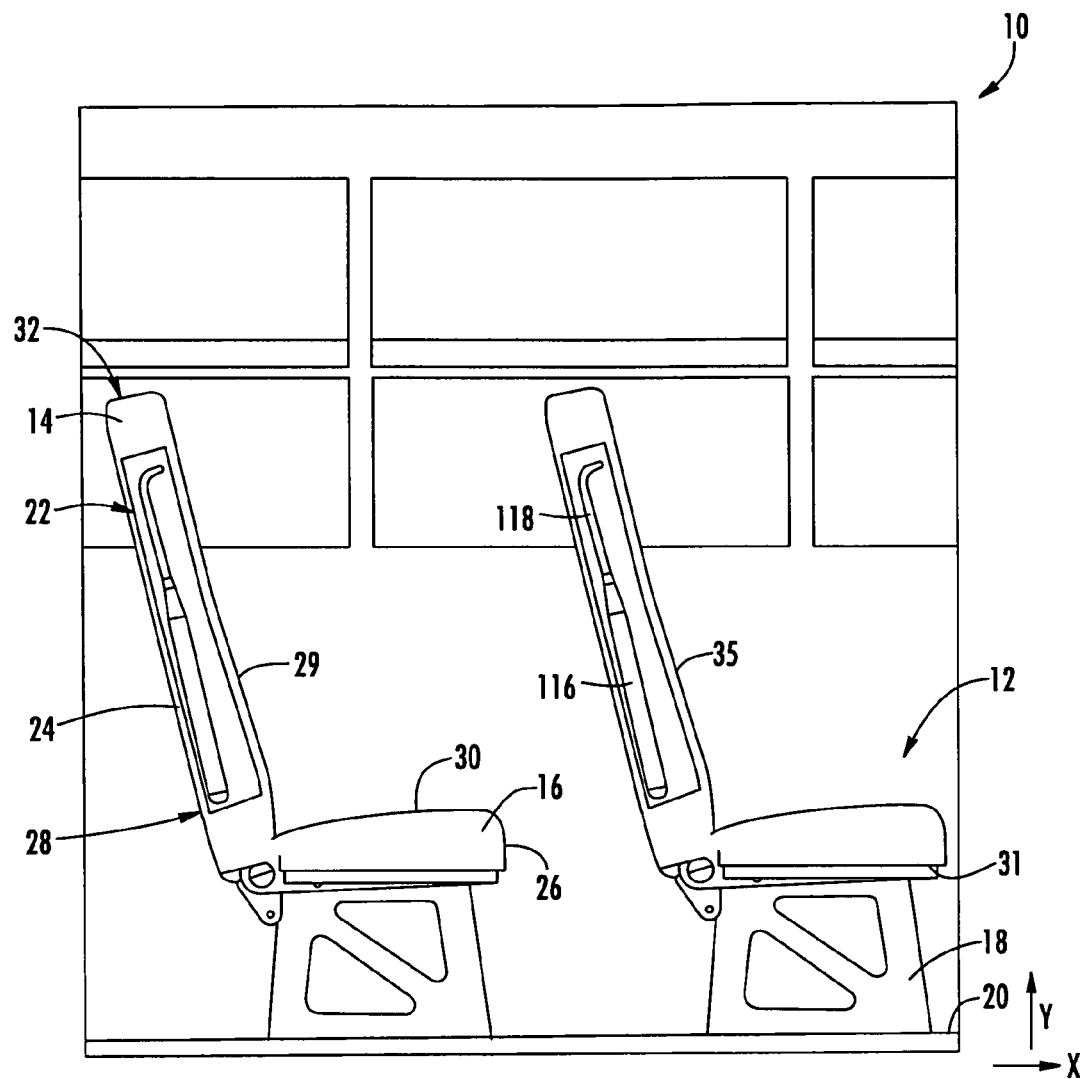
FIG. 1 is a view of airbag devices installed in vehicle seats of a bus or motor coach according to an embodiment of the present invention.

Hereinafter, embodiments of the present invention will be described with reference to the drawings. FIG. 1 discloses the general environment in which the airbag device may be used. As can be seen, a row of vehicle seats 12 are disposed in an interior compartment of a motor vehicle 10, such as a bus or motor coach. The vehicle seats 12 may comprise a back support 14, a sitting pad 16, and a support structure 18 that may be fixed or slidably attached to the floor 20 and/or wall of the interior compartment of the motor vehicle 10. An airbag device 22 for protecting a vehicle occupant in the vehicle seat 12 fits inside an interior compartment 24 located in the back support 14 of the seat 12.

Figure 2:
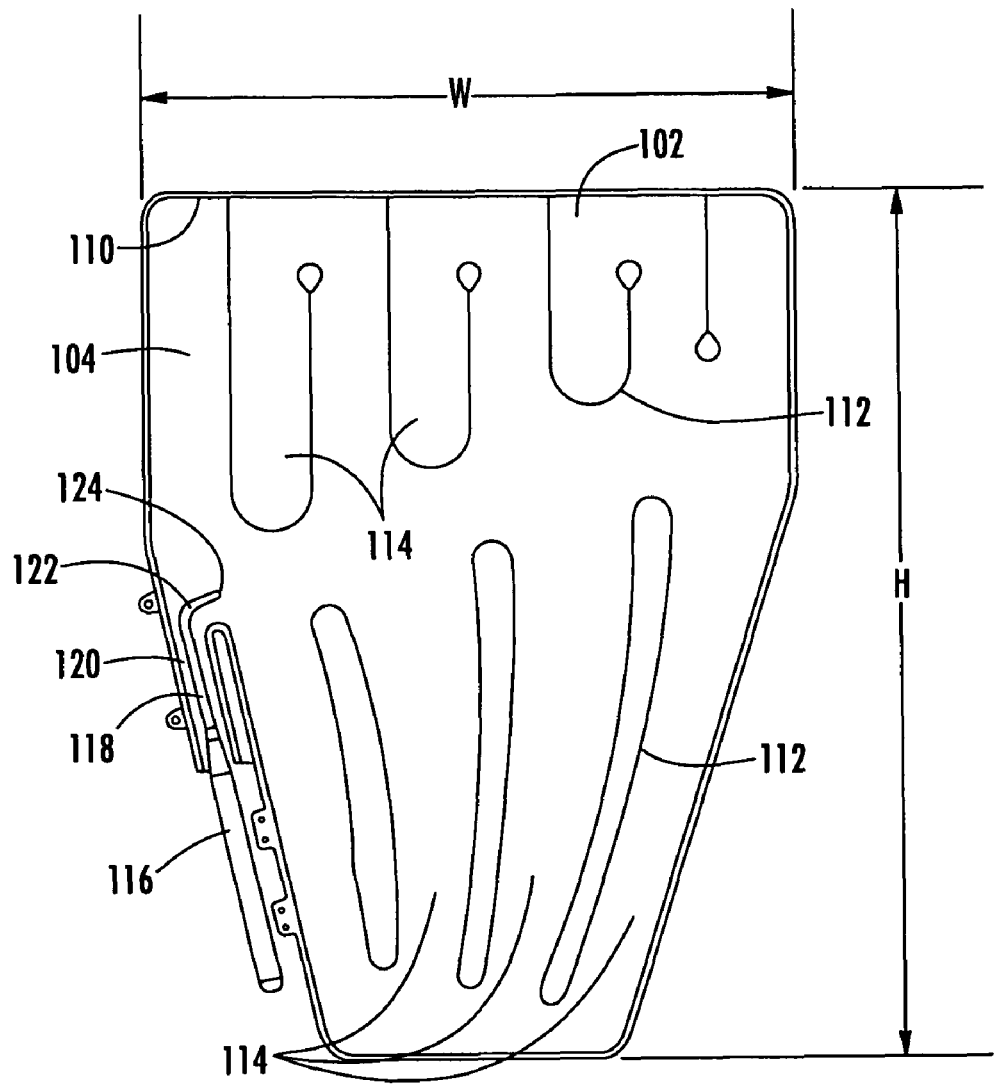
FIG. 2 is a cross-sectional view of an airbag cushion according to an embodiment of the present invention.
Figures 3A, 3B:
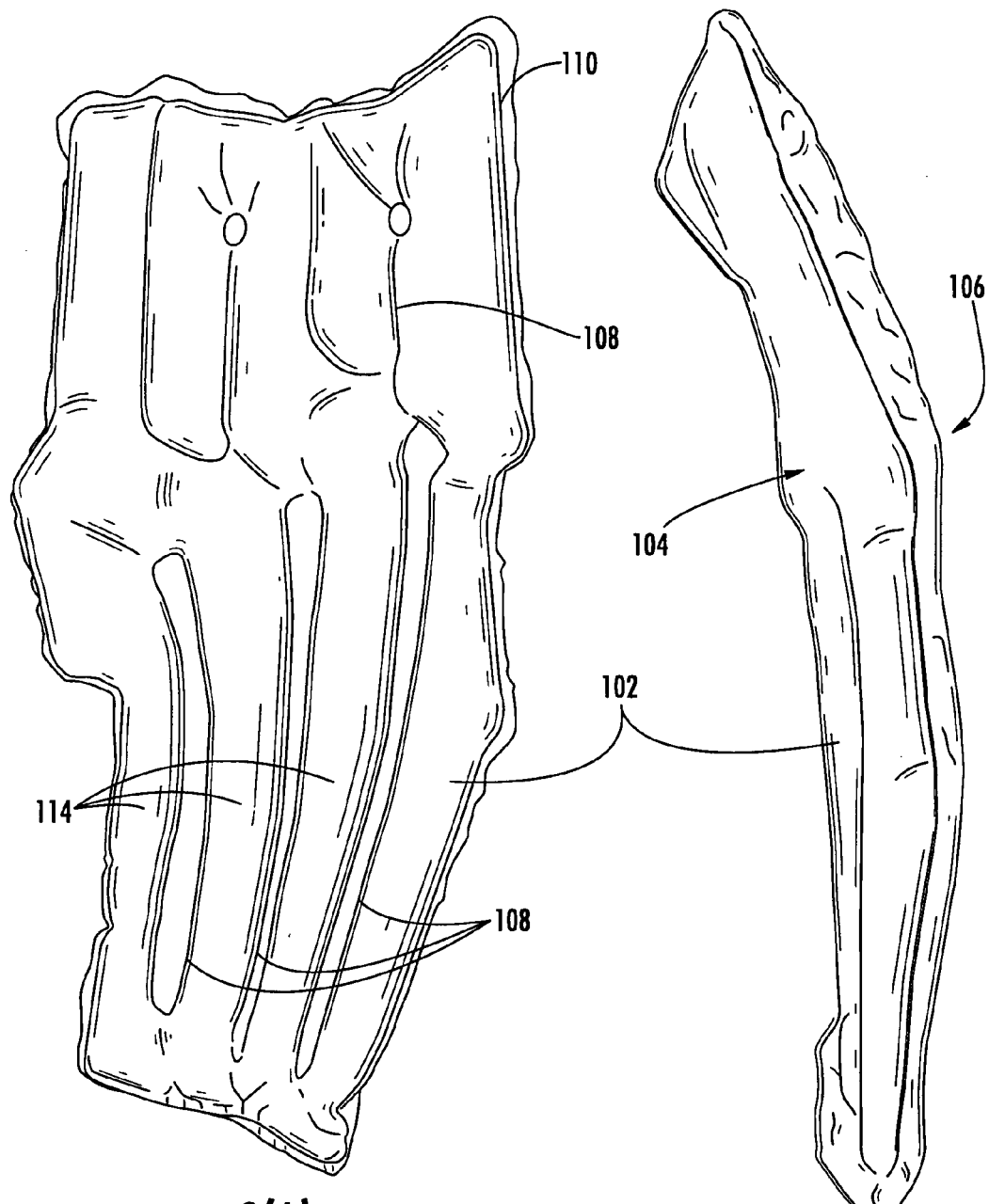
FIGS. 3(A) and 3(B) are front and side views of an airbag cushion according to an embodiment of the present invention.

The airbag device 22 may comprise an airbag cushion 102 as seen in FIGS. 2, 3(A), and 3(B). The airbag cushion is formed from two or more panels that are attached together using stitching, adhesive, or other forms of attachment known in the art. For example, FIGS. 3(A) and 3(B) show an airbag cushion 102 formed by a plurality of seam lines 108 created by stitching the panels 104 and 106 together. The seam lines 108 may be used to attach the panels 104 and 106 along the outer periphery thereof, thus creating outer seams 110 to form an enclosure which captures gas from an inflator so that the airbag cushion may be inflated. Optionally, seams lines 108 may be made within the outer periphery, thus creating inner seams 112 to form a plurality of inflation chambers 114. The airbag cushion is in fluid communication with an inflator 116 via a fill tube 118, as seen in FIG. 2. The details of the inflator and fill tube will be described later. Any suitable material may be used for the panels 104 and 106, such as Nylon or other suitable polymer. The airbag cushion (i.e., the two panels 104 and 106) may be preferably sealed so as to maintain an extended "inflation time" of 3-8 seconds at >50% peak pressure to provide protection during long-duration impacts and rollover conditions experienced by buses or motor coaches. Also, note that the panels 104 and 106 may be, in one embodiment, formed from a single sheet of fabric (or other suitable material) folded back on itself and sewn around at least three sides of the perimeter to create an enclosed volume.

The size of the airbag cushion 102 is dimensioned such that the cushion may function as a side airbag and as a curtain airbag so as to cover an area of an interior wall of the motor vehicle upon deployment. The area covered by the airbag will be described in terms of width W and height H. The width W is the maximum distance of the deployed airbag running in the front to rear (or horizontal) direction X of the vehicle. The height H is the maximum distance of the deployed airbag running in the top to bottom (or vertical) direction Y of the vehicle.

Figure 13:
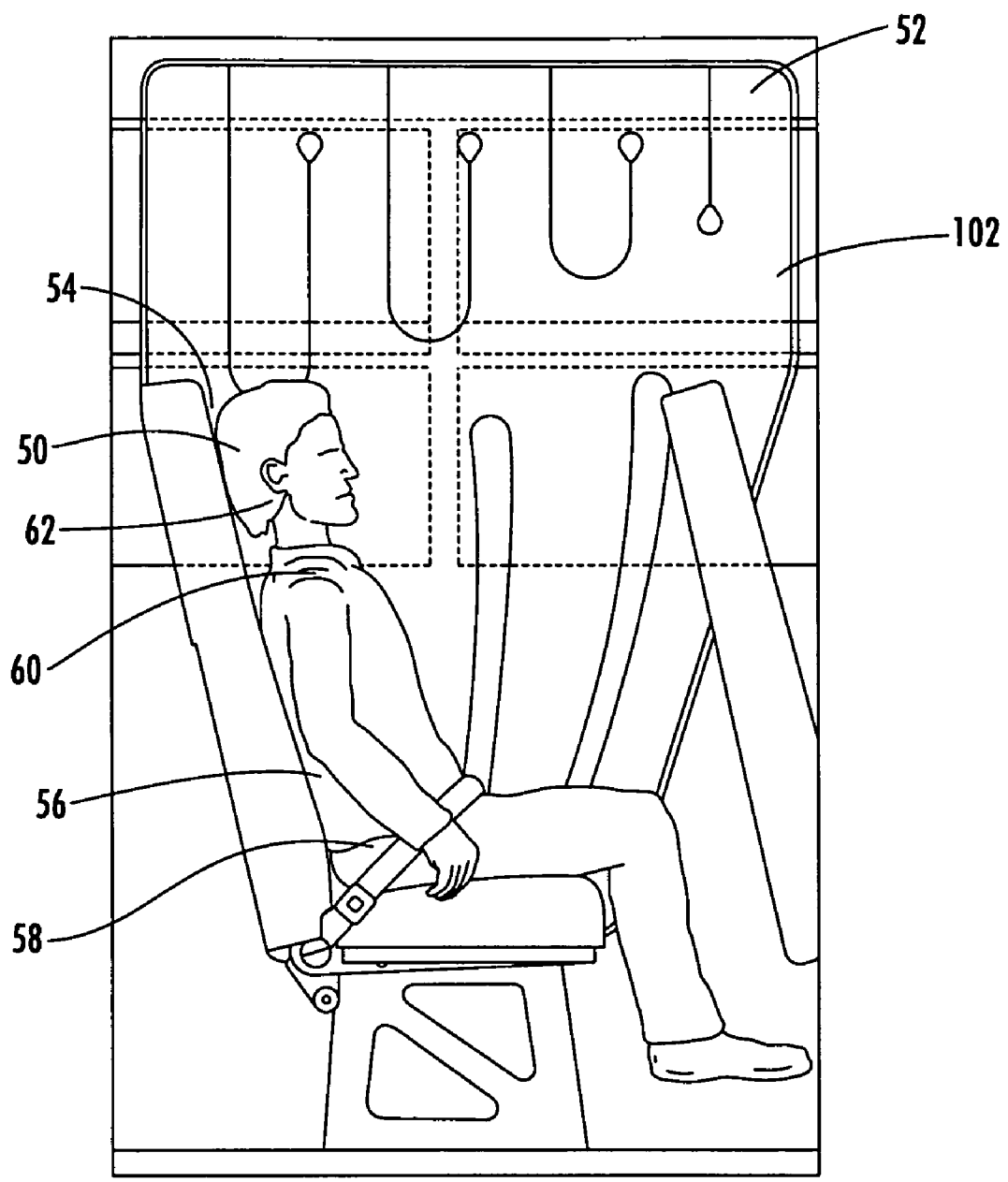
FIG. 13 is a view of a deployed airbag cushion according to an embodiment of the present invention.

FIG. 13 shows an embodiment of the deployed airbag cushion which shows the relation between the deployed airbag cushion 102 and a vehicle occupant 50, such as a child or an adult. The airbag cushion 102 of FIG. 13 functions as a side airbag and as a curtain airbag so as to cover an area of a portion of an interior side wall 52, a portion of a window glass 54, or a combination thereof of the vehicle upon deployment. The airbag cushion 102 may have a width in fore and aft directions and a height which result in the portion of window glass 54, the portion of the interior side wall 52, or the combination thereof being covered in a vicinity of the vehicle occupant 50 such that a thorax 56, a pelvis 58, a shoulder 60 and a head 62 of the vehicle occupant 50 are protected from directly contacting adjacent interior side surfaces of the motor vehicle during a crash event. The airbag cushion of FIG. 13 may have the same, similar, or different dimensions from the embodiments of the airbag cushion described in reference to FIG. 4 and the following discussion.

Figure 4:
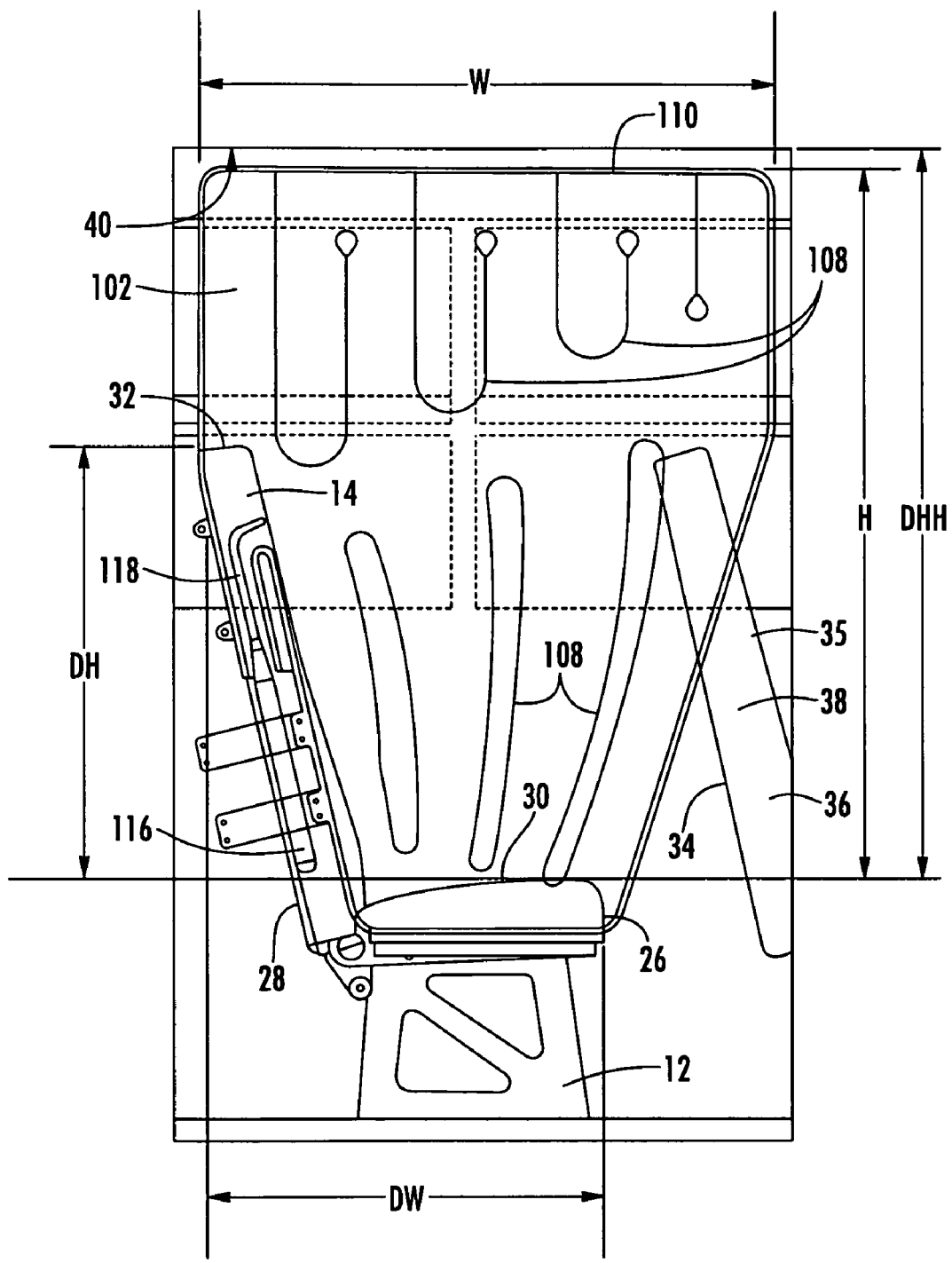
FIG. 4 is a view of a deployed airbag cushion according to an embodiment of the present invention.

For the embodiment of the airbag cushion in FIG. 4, the area covered by the deployed airbag cushion 102 may have a width W greater than a distance DW spanning from a substantially vertical rear surface 28 of a back support 14 of the vehicle seat 12 to a front edge 26 of the sitting pad 16 of the vehicle seat. Additionally, the area covered by the deployed airbag cushion 102 may have a height H greater than a distance DH spanning from a top surface 30 of the sitting pad 16 to the top edge 32 of the back support 14. This configuration may be advantageous because of government legislation requiring taller seat backs in school buses.

The size of the airbag cushion may be any suitable size such that its function as a side airbag and a curtain airbag may be performed. For example, the width W of the airbag cushion 102 may be a distance greater than a distance spanning from the substantially vertical rear surface 28 of the back support 14 to a point in front of a second substantially vertical rear surface 34 of a second back support 36 of a second vehicle seat 38 located in front the vehicle seat 12, as seen in FIG. 4. Other embodiments of the present invention may include different starting and/or ending points in the determination of the distance DW (the distance from which the width W of the airbag is judged to be greater than).

Examples of suitable starting points for DW may include the substantially vertical rear surface 28 of the back support 14, the substantially vertical front surface 29 of the back support (see FIG. 1), a vertical plane intersecting either the front surface 29 or the rear surface 28 of the back support 14, a vertical plane located behind the rear surface 28 of the back support. Examples of suitable ending points for DW may include the front edge 26 of the sitting pad 16 of the vehicle seat, a point in front of a second substantially vertical rear surface 34 of a second back support 36 of a second vehicle seat 38 located in front of the vehicle seat 12, a point in front of a second substantially vertical front surface 35 of the second back support 36 of the second vehicle seat 38 located in front of the vehicle seat 12, a vertical plane that intersects the second substantially vertical rear surface 34 or the second substantially vertical front surface 35 of the second back support 36 of the second vehicle seat 38 located in front of the vehicle seat 12. In this context, substantially vertical is a direction in which an object is at an angle of less than 30° or less from the vertical direction Y, such less than 25°, 20°, 15°, 10°, 5°, or 0° from the vertical direction Y.

Alternatively or additionally, the height H of the airbag cushion 102 may span a distance DHH spanning from the top surface 30 of the sitting pad 16 to a point substantially near a roof 40 of the vehicle 10. Other embodiments of the present invention may include different starting and/or ending points in the determination of the distance DH (the distance from which the height H is judged to be greater than). Examples of suitable starting points for DH may include the top surface 30 of the sitting pad 16, the bottom surface 31 of the sitting pad 16, or a horizontal plane intersecting either the top or bottom surfaces of the sitting pad. Examples of suitable ending points for DH may include the top edge 32 of the back support 14, a point substantially near a roof 40 of the vehicle 10, the roof 40 of the vehicle 10, or a point substantially midway between the top edge 32 of the back support 14 and the roof 40 of the vehicle.

As previously mentioned in relation to FIG. 2, the airbag device may have an inflator 116 and a fill tube 118 fluidly connecting the inflator 116 and the airbag cushion 102, wherein the fill tube 118 is typically disposed along a length of the back support 14 of the vehicle seat 12. The fill tube 118 and inflator 116 may take many different forms. For example, in FIGS. 1-2, the inflator may be attached at one end of the fill tube 118 while the other end of the fill tube 118 is inserted into an inflow passage 120 of the airbag cushion 102. In this embodiment, the fill tube 118 may have a bend 122 such that the open end 124 of the fill tube 118 reaches into at least one of the inflation chambers 114. The bend 122 may be curved and may form a 90° angle; however, other possible angles may be used, such as 10°, 30°, 45°, 60°, 120°, 135°, 150°, or any angle therebetween. Also, the open end 124 may have a welded or crimped cap with pierced, drilled, or similarly formed holes in the fill tube 118 to allow gas to exit the tube 118 in a direction substantially perpendicular to the axis of the tube.

Figure 5:
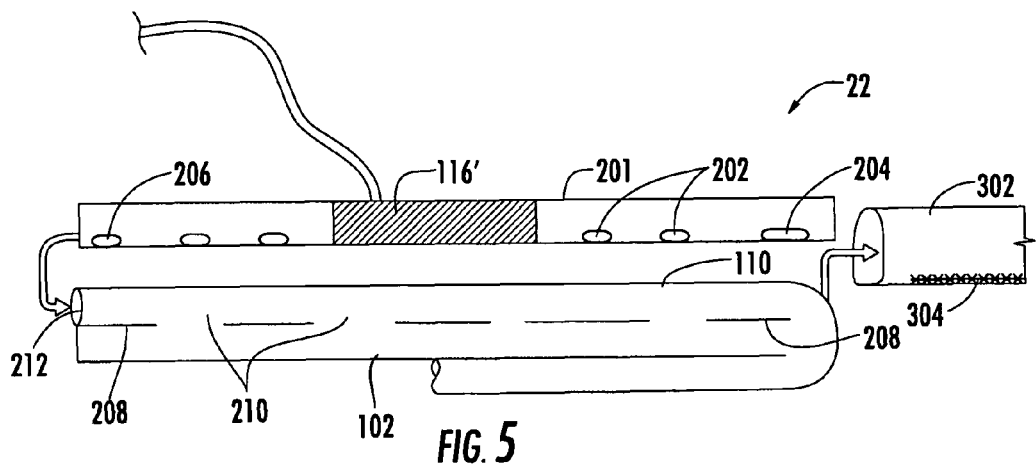
FIG. 5 is an exploded view of an airbag device according to an embodiment of the present invention.

According to another embodiment, as shown in FIG. 5, a fill tube 201 may have a plurality of apertures 202 along a circumferential surface of the fill tube 201. The plurality of circumferential apertures 202 may comprise an aperture 204 on one end of the fill tube 201 having a larger diameter than an aperture 206 located at the other end of the fill tube 201. Alternatively or additionally, the aperture 204 may have a larger diameter than all the other circumferential apertures 202. The larger hole 204 may be placed at the upper portion of the deployed airbag cushion 102 (see FIGS. 11(A) and 11(B)) where there may be a plurality of inflation chambers 114' that are not in direct fluid contact with an aperture of the fill tube 118.

Also, the inflator 116' may be integral with the fill tube 201 at a midpoint of the fill tube. In this embodiment, the airbag cushion 102 can be rolled up so as to fit into the interior compartment of the back support 14 of the seat 12. The fill tube 201 and inflator 116 are inserted into the airbag cushion 102 at a receiving portion 212 so that the fill tube 201 runs along a length of the airbag cushion 102. In this embodiment, the receiving portion 212 may be formed between the seams 110 at the outer periphery of the airbag cushion 102 and a series of internal seams 208 running substantially parallel to the outer periphery. The spaces 210 between the internal seams 208 are used as flow passages so that the gas flowing through the apertures 202 enter through the inflatable chambers 114 via these spaces 210. Optionally, the airbag cushion may then be inserted into a sleeve 302 with tearable seams 304 before the assembly is inserted into the back support 14 of the seat 12. According to one embodiment of the present invention, a short fill tube (<350 mm) may be included to ensure the cushion integrity and address inflation efficiency challenges associated with remotely-mounting an inflator. The inclusion of the inflator within the seat itself may decrease the cost of manufacture while maintaining functionality.

Figure 6:
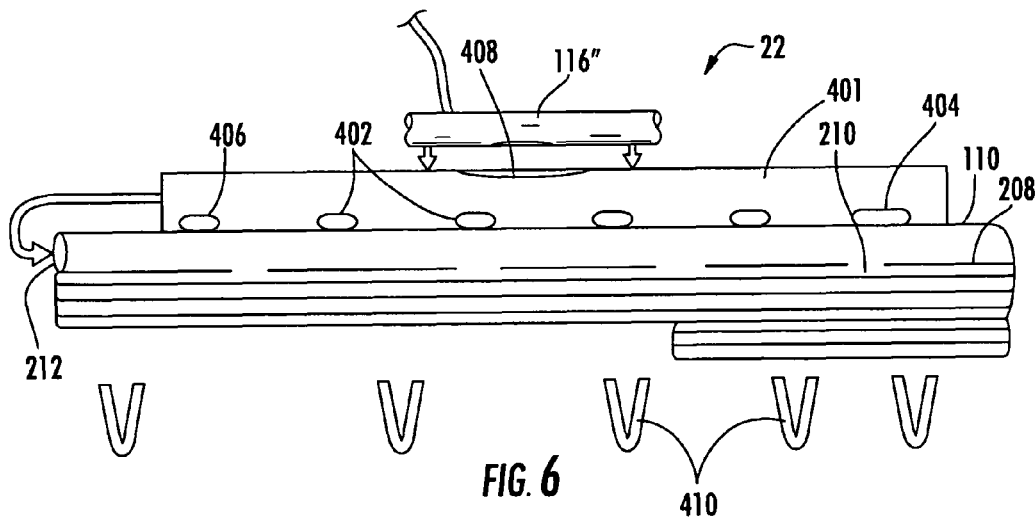
FIG. 6 is an exploded view of an airbag device according to another embodiment of the present invention.

According to another embodiment, shown in FIG. 6, the fill tube 401 has a plurality of apertures 402 along a circumferential surface of the fill tube 401. The plurality of circumferential apertures 402 may comprise an aperture 404 on one end of the fill tube 401 having a larger diameter than an aperture 406 located at the other end of the fill tube 401. Alternatively or additionally, the aperture 404 may have a larger diameter than all the other circumferential apertures 402. The larger hole 404 may be placed at the upper portion of the deployed airbag cushion 102 (see FIGS. 11(A) and 11(B)) where there may be a plurality of inflation chambers 114' that are not in direct fluid contact with an aperture of the fill tube 118.

Also, the inflator 116" is attached at a middle point of the fill tube 401 by using clamps, attachment bands, straps, or other attachment devices known in the art so that gas generated by or released from the inflator 116" is channeled into the inflow aperture 408 of the fill tube 401. A seal may be desirable at the interface of the inflator 116" and the fill tube 401 so that there are no leaks as the gas passes from the inflator 116" into the inflow aperture 408 of the fill tube 401. In the embodiment of FIG. 6, the airbag cushion 102 can be folded up so as to fit into the interior compartment of the back support 14 of the seat 12. The fill tube 401 and inflator 116" are inserted into the airbag cushion 102 at the receiving portion 212 so that the fill tube 401 runs along a length of the airbag cushion 102. The receiving portion 212 may be formed between the seams 110 at the outer periphery of the airbag cushion 102 and a series of internal seams 208 running substantially parallel to the outer periphery. The spaces 210 between the internal seams 208 are used as flow passages so that the gas flowing through the apertures 402 enter through the inflatable chambers 114 via these spaces 210.

Optionally, the airbag cushion may then be inserted into a sleeve 302 with tearable seams 304 (as seen in FIG. 5); or adhesive strips 410 (as seen in FIG. 6) or bands with tearable seams may be disposed at various points along the assembly so that the airbag cushion may maintain its folded condition before the assembly is inserted into the back support 14 of the seat 12. The combination of the inflator and fill tube would preferably ensure all chambers of the airbag cushion will be inflated and in position to provide occupant restraint within approximately 22 ms.

The airbag cushion 102 may be folded or rolled up, as previously mentioned. For example, the use of a rapidly-deploying directional fold, along with a rapid-onset inflator, may be used so as to offset the very fast intrusion rate typically experienced in side impact events.

Once the airbag cushion 102, the fill tube, and the inflator 116 are assembled, this airbag assembly is placed into an interior compartment or void volume 24 of the back support 14. For example, the back support 14 of the seat 12 may be a polymeric foam with a cut-out space in which the airbag assembly is placed. An aperture exists in the seat covering that covers the polymeric foam so that the airbag assembly may be inserted in the back support 14. The aperture may be along the side of the back support 14.

Figures 7, 8, 9:
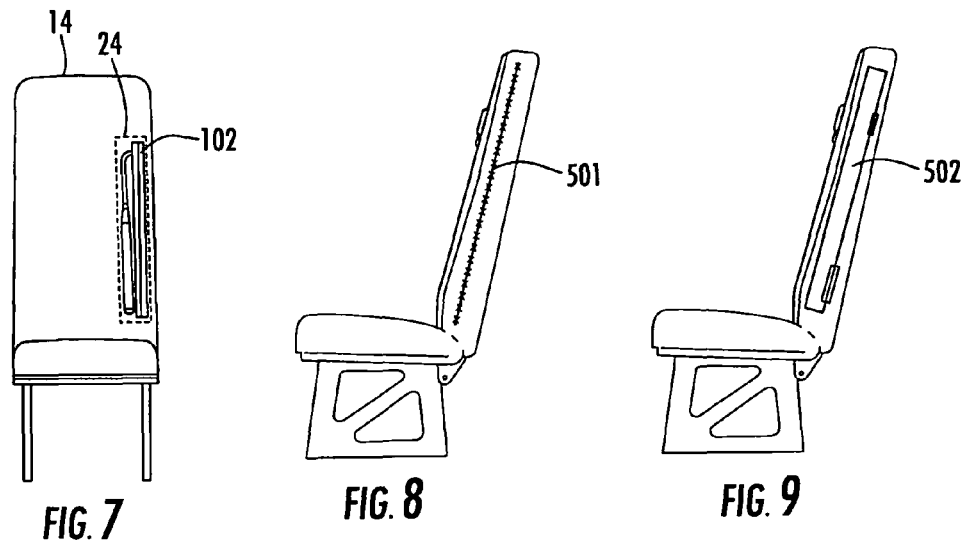
FIG. 7 is a view of the airbag device installed in a vehicle seat according to an embodiment of the present invention.
FIG. 8 is a side view of the vehicle seat showing a tearable seam according to an embodiment of the present invention.
FIG. 9 is a side view of the vehicle seat showing a tamper resistant panel according to an embodiment of the present invention.

The inflator mounting position or location may be positioned within the vehicle seat so as to optimize for functionality and comfort of the occupant. For example, the airbag device may permit comfortable occupant seating by locating the airbag assembly in the seat 12 in such a way that the occupant does not come into contact with any "hard points" of the airbag device. As shown in FIG. 7, by packaging the rigid- or semi-rigid components (e.g., metal, injection molded or extruded plastic) of the airbag device in the seat between 0 mm and 500 mm above the seat bight line and/or at least 10 mm behind the A-surface of the seat, the hard points on the airbag device remained below and/or behind the shoulder of the occupant, thus preventing the occupant from feeling the airbag when sitting in the seat.

After the airbag assembly is placed in the back support of the vehicle seat, the aperture in the seat covering is closed or covered. According to one embodiment, seen in FIG. 8, the back support 14 of the vehicle seat 12 has a tearable seam 501 on the seat covering that covers the polymeric foam. The tearable seam 501 ruptures during the deployment of the airbag cushion. According to another embodiment, as seen in FIG. 9, the back support has a tamper resistant panel 502, such as a tamper resistant A-surface cover. The panel 502, for example, may be hinged, attached by adhesive, mounted by fasteners, and/or fixed by stitching. After the airbag assembly is installed in the seat, the airbag cushion deploys through the tearable seam or the tamper resistant panel. With the tearable seam or tamper resistant panel, the airbag may still be deployed through these devices while ensuring that the airbag device is not tampered with by vehicle occupants.

The location of the tearable seam 501 or the tamper resistant panel 502 along the side of the back support 14 of the vehicle seat may provide the benefit of preventing any tampering with the airbag assembly because of the limited space between the interior wall of the bus or motor coach and the seat side. In other words, by packaging the airbag device inside the back support of the seat itself, and with the limited distance between the outside edge of the seat and the interior wall of the bus or motor coach, the airbag is protected from unauthorized access. Thus, the airbag is protected from tampering and/or vandalism, which may be a challenge especially in school buses. With such a configuration, the seat 12 must be removed from the vehicle before the airbag device can be accessed.

Figure 10:
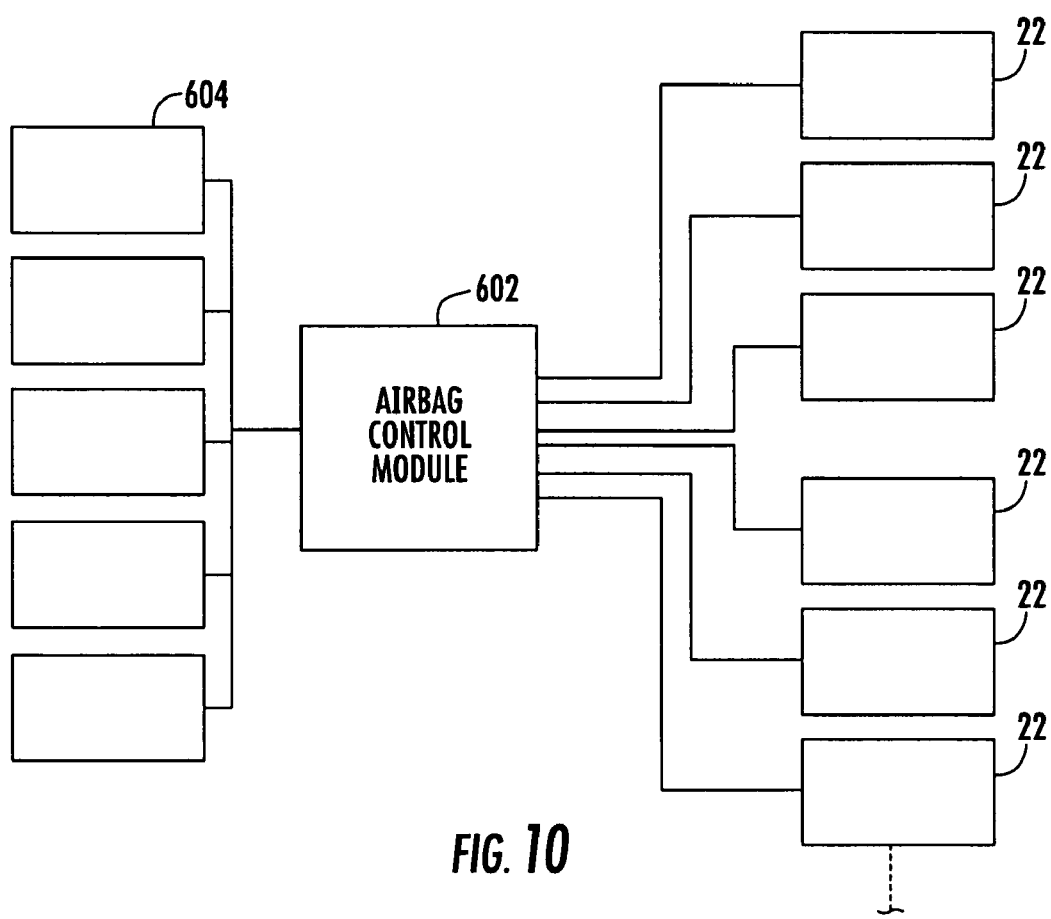
FIG. 10 is a schematic view is a occupant safety system according to an embodiment of the present invention.

After each seat 12 in the bus, motor coach, or similar vehicle is installed with an airbag device, the individual inflators will be activated by an occupant safety system. As seen in FIG. 10, the bus or motor coach comprises an airbag control module 602, one or more sensors 604 used to detect impacts which are known in the art, and one or more airbag devices 22 in the seat(s). The control module 602 receives signals from the one or more sensors. If the control module determines that a crash event is occurring, it sends a deployment signal to one or more airbag devices 22 if the crash parameters deem a deployment in one or more airbag devices 22 is necessary to protect one or more occupants.

Figure 11A:
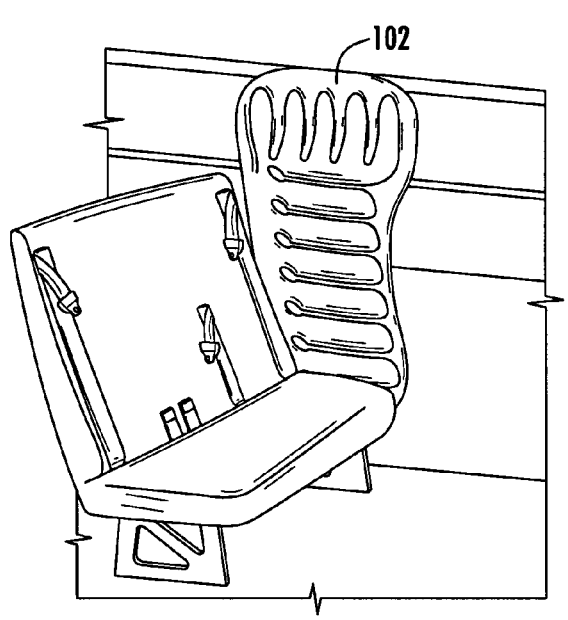
FIGS. 11(A) and 11(B) are views of the airbag device during deployment according to an embodiment of the present invention.
Figure 11B:
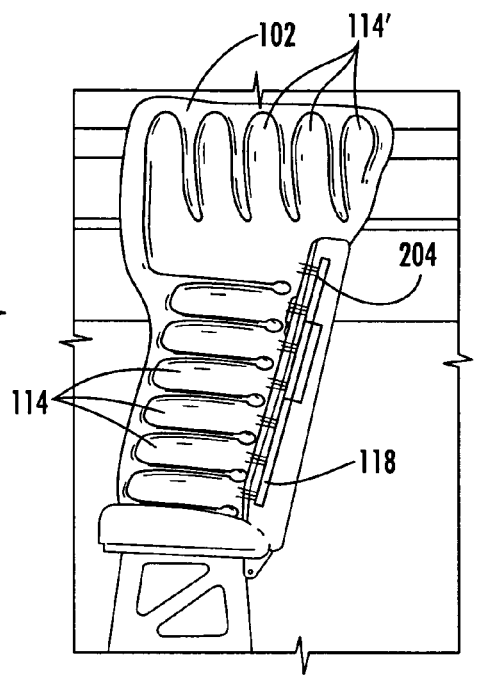

Once a signal is sent to the airbag device 22, the inflator 116 is activated causing gas to flow through the fill tube 118. As can be seen in FIGS. 11(A) and 11(B), the airbag cushion 102 inflates by the flow of gas flowing through the plurality of apertures of the fill tubes in which each aperture of the fill tube 118 may inflate a particular chamber 114 of the airbag cushion 102. The larger hole 204 may be placed at the upper portion of the deployed airbag cushion 102 where there may be a plurality of chambers that are not in direct fluid contact with an aperture of the fill tube 118. The inflating airbag cushion 102 eventually breaks through the tearable seams 501, or pushes away the tamper resistant panel 502 so as to exit the back support 14 of the seat 12. As the airbag inflates and covers the interior wall and windows of the bus or motor coach, the airbag cushion 102 may be able to fold if it contacts the seat in front of the seat in which it is housed so that the airbag cushion is fully deployed along the wall and windows. In addition, the airbag cushion deploys between the seat occupant and the window/wall of the vehicle to push the seat occupant inward and away from the side impact so as to prevent the occupant from being struck from above or being caught between the airbag cushion and the window/wall.

Figure 12A:
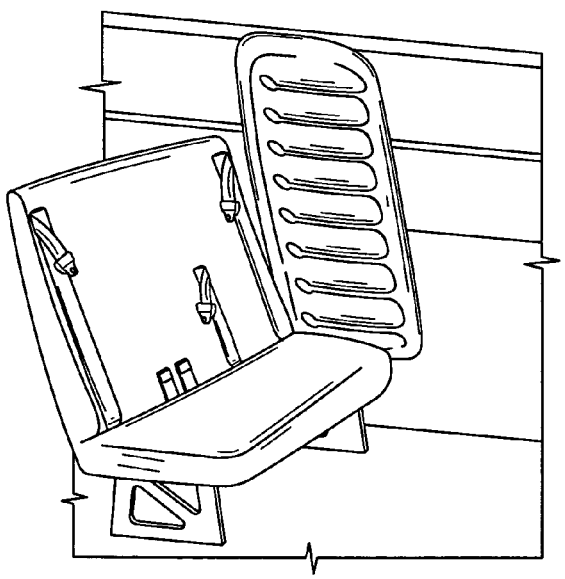
FIGS. 12(A) and 12(B) are views of the airbag device during deployment according to another embodiment of the present invention.
Figure 12B:
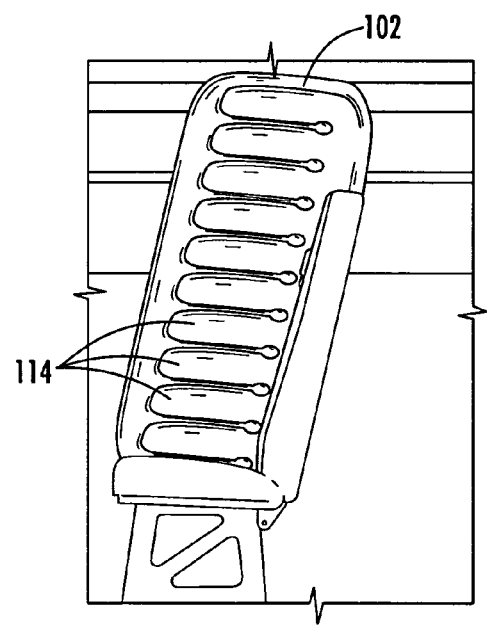

Other embodiments of the disclosed airbag device are also contemplated. For example, instead of a filling tube with a plurality of apertures along its circumferential surface, a filling tube with an axial hole (as seen in FIGS. 1-2) or a filling tube with a combination of axial and circumferential holes may be used. Also, different configurations of inflation chambers 114 in the airbag cushion 102 (as seen in FIGS. 12(A) and 12(B)) are contemplated. Furthermore, according to another embodiment, the airbag device may be placed in the sitting pad 16 in a fashion similar to the embodiment in which the assembly is placed in the back support 14 (as seen in FIG. 1).

The disclosed airbag is the first to be designed to function as both a curtain and a side airbag in the environment of a bus (such as a school bus) or a motor coach. The airbag module is designed to allow FMVSS 222 seat articulation without interfering with the occupant protection or the energy-absorbing capacity of either the seat or the airbag.

The disclosed airbag device and vehicle may provide one or more of the following benefits: (1) the device may balance employment loading/breakout forces such that a full-sized occupant is protected such that the Insurance Institute for Highway Safety (IIHS) "Technical Working Group" out-of-position occupant test protocols are satisfied; (2) the side deployment of the airbag device applies less force on the head and neck of the vehicle occupant than the traditional curtain airbag; (3) the airbag device is designed in such a way as to allow an occupant to sit comfortably without reducing the effectiveness of either the airbag or the seat structure in a crash event; (4) the airbag cushion is designed to be a taller and wider side airbag which provides protection to the occupant's pelvis/torso as well as head/shoulders in addition to protecting the occupant in a rollover; (5) a rapidly-deployed airbag cushion with a directional fold allows the airbag device to provide restraint quickly even though buses exhibit a smaller distance between a properly-seated occupant and the exterior of the bus than that which exists for passenger cars; (6) by incorporating the fill tube which routes gas into the airbag cushion, and using an inflator with an appropriate size-to-performance ratio, the required airbag cushion pressures and inflation times can be met without comprising the seat design; (7) the number and the severity of injuries in accidents involving buses, especially head and thorax injuries may be reduced; (8) occupant ejection through a bus window by providing a combination of early restraint (absorbing an occupant's energy earlier in a crash event) and at least partially covering the window glass will be effectively reduced; and (9) the airbag being deployed between the occupant and the window to push him or her inward and away from the side impact may prevent an occupant from being struck from above or between caught between the cushion and the window.

Furthermore, in view of the fact that people of a wide variety of sizes currently ride in buses today (such as children and adults of various sizes), and could occupy any seating position, the disclosed airbag device may be robustly designed to comply with the out-of-position ("OOP") child testing protocols developed by the IIHS-sponsored Technical Working Group ("TWG") to demonstrate that a minimum risk to smaller seat occupants exists when the disclosed airbag is deployed.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag device for protecting a vehicle occupant in a vehicle seat of a motor coach or bus, comprising:
    an airbag cushion that functions as a side airbag and as a curtain airbag so as to cover an area of a portion of an interior side wall of the motor coach or bus, a portion of a window glass, or a combination thereof upon deployment;
    wherein the airbag cushion has a width in fore and aft directions and a height which result in the portion of window glass, the portion of the interior side wall, or the combination thereof being covered in a vicinity of the vehicle occupant such that a thorax, a pelvis, a shoulder and a head of the vehicle occupant are protected from directly contacting adjacent interior side surfaces of the motor coach or bus during a crash event,
    wherein the airbag device is configured to be seat mounted,
    wherein the height of the airbag cushion upon deployment is configured to span a distance from a top surface of a sitting pad of the vehicle seat to a point substantially near a roof of the motor coach or bus, and
    wherein the width of the airbag cushion upon deployment is a distance spanning from a substantially vertical rear surface of a back support of the vehicle seat to a second substantially vertical rear surface of a second back support of a second vehicle seat located in front of the vehicle seat.

2. The airbag device according to claim 1, further comprising an inflator and a fill tube fluidly connecting the inflator and the airbag cushion, wherein the fill tube is disposed along a length of the back support of the vehicle seat upon installation.

3. The airbag device according to claim 2, wherein the fill tube has a plurality of apertures along a circumferential surface of the fill tube, wherein the plurality of apertures comprises a large aperture on one end of the fill tube having a larger diameter than a small aperture located at the other end of the fill tube.

4. The airbag device according to claim 2, wherein the fill tube has a bend at an open end of the fill tube such that the open end reaches into at least one inflation chamber of the airbag cushion.

5. The airbag device according to claim 2, wherein the inflator is integral with the fill tube at a midpoint of the fill tube.

6. The airbag device according to claim 1, further comprising the vehicle seat with an interior compartment or volume in which the airbag cushion is mounted before deployment, and wherein the interior compartment or volume is located in the back support of the vehicle seat.

7. The airbag device according to claim 6, wherein the back support of the vehicle seat has a tearable seam that ruptures during the deployment of the airbag cushion.

8. The airbag device according to claim 6, wherein the back support has a tamper resistant panel.

9. A vehicle, comprising:
a vehicle seat comprising a back support and a sitting pad; and
a seat mounted airbag device for protecting a vehicle occupant in the vehicle seat, wherein the airbag device comprises an airbag cushion that functions as a side airbag and as a curtain airbag so as to cover an area of a portion of window glass, a portion of an interior side wall of the vehicle, or a combination thereof upon deployment;
wherein the airbag cushion has a width in fore and aft directions and a height which result in the portion of window glass, the portion of the interior side wall, or the combination thereof being covered in a vicinity of the vehicle occupant such that a thorax, a pelvis, a shoulder and a head of the vehicle occupant are protected from directly contacting adjacent interior side surfaces of the vehicle during a crash event,
wherein the vehicle is a motor coach or bus, and
wherein the width of the airbag cushion upon deployment is a distance spanning from a substantially vertical rear surface of the back support to a second substantially vertical rear surface of a second back support of a second vehicle seat located in front of the vehicle seat.

10. The vehicle according to claim 9, wherein the area covered by the airbag cushion upon deployment has a height greater than a distance spanning from a top surface of the sitting pad to a top edge of the back support of the vehicle seat.

11. The vehicle according to claim 9, wherein the height of the airbag cushion upon deployment is a distance spanning from a top surface of the sitting pad of the vehicle seat to a point substantially near a roof of the vehicle.

12. The vehicle according to claim 9, further comprising an inflator and a fill tube fluidly connecting the inflator with the airbag cushion, wherein the fill tube is disposed along a length of the back support of the vehicle seat upon installation.

13. The vehicle according to claim 12, wherein the fill tube has a plurality of apertures along a circumferential surface of the fill tube, wherein the plurality of apertures comprises a large aperture on one end of the fill tube having a larger diameter than a small aperture located at the other end of the fill tube.

14. The vehicle according to claim 12, wherein the fill tube has a bend at an open end of the fill tube such that the open end reaches into at least one inflation chamber of the airbag cushion.

15. The vehicle according to claim 12, wherein the inflator is integral with the fill tube at a midpoint of the fill tube.

16. The vehicle according to claim 9, wherein the vehicle seat comprises an interior compartment in which the airbag cushion is mounted before deployment, and wherein the interior compartment is located in the back support of the vehicle seat.

17. The vehicle according to claim 16, wherein the back support of the vehicle seat has a tearable seam that ruptures during the deployment of the airbag cushion.

18. The vehicle according to claim 16, wherein the back support has a tamper resistant panel.

* * * * *